US012776662B2

(12) United States Patent
Nagai et al.

(10) Patent No.: US 12,776,662 B2
(45) Date of Patent: Oct. 27, 2026

(54) WIRELESS COMMUNICATION CHARGING CIRCUIT SYSTEM FOR WIRELESSLY RECEIVING POWER AND PERFORMING WIRELESS COMMUNICATION

(71) Applicant: Murata Manufacturing Co., Ltd., Kyoto-fu (JP)

(72) Inventors: Takahiro Nagai, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 795 days.

(21) Appl. No.: 18/311,193

(22) Filed: May 2, 2023

(65) Prior Publication Data

US 2023/0268776 A1 Aug. 24, 2023

Related U.S. Application Data

(63) Continuation of application No. PCT/JP2021/040475, filed on Nov. 3, 2021.

(30) Foreign Application Priority Data

Nov. 16, 2020 (JP) ................................ 2020-190074

(51) Int. Cl.
*H01M 10/46* (2006.01)
*H02J 50/12* (2016.01)
(Continued)

(52) U.S. Cl.
CPC .............. *H02J 50/12* (2016.02); *H02J 50/80* (2016.02); *H04B 5/263* (2024.01); *H04B 5/266* (2024.01); *H04B 5/79* (2024.01)

(58) Field of Classification Search
CPC .. H02J 50/12; H02J 50/10; H02J 50/80; H02J 7/42; H04B 5/263; H04B 5/79; H04B 5/48; H04B 5/266
(Continued)

(56) References Cited

U.S. PATENT DOCUMENTS

2023/0091589 A1* 3/2023 Nagai ................ G06K 19/0701 235/492
2023/0268774 A1* 8/2023 Kaiwa ..................... H02J 50/12 307/104
2023/0275465 A1* 8/2023 Sakamoto ................. H02J 7/64 307/11

FOREIGN PATENT DOCUMENTS

JP 2012-238126 A 12/2012
JP 2016-118029 A 6/2016
(Continued)

OTHER PUBLICATIONS

International Search Report issued in PCT/JP2021/040475; mailed Dec. 14, 2021.

*Primary Examiner* — Edward Tso
(74) *Attorney, Agent, or Firm* — Studebaker Brackett PLLC

(57) ABSTRACT

An electronic card of a wireless communication charging circuit system includes a power reception coil, a power reception circuit, a power storage device, a charging circuit, a voltage conversion circuit that is connected to the power storage device and generates a prescribed power supply voltage, a communication antenna, a communication circuit that performs communication using output power of the voltage conversion circuit, and a control circuit that controls the voltage conversion circuit and the charging circuit. The control circuit sets a power path in a communication period so that the communication circuit performs communication and power used by a microcontroller is supplied from the
(Continued)

101 power storage device, and sets a power path in a charging period so that a reader-writer device, which was made to recognize the communication circuit, generates a magnetic field and power used by the microcontroller is supplied from the power reception circuit.

20 Claims, 7 Drawing Sheets

(51) Int. Cl.
*H02J 50/80* (2016.01)
*H04B 5/26* (2024.01)
*H04B 5/79* (2024.01)

(58) Field of Classification Search
USPC ................................ 320/107, 108, 114, 115
See application file for complete search history.

(56) References Cited

FOREIGN PATENT DOCUMENTS

JP 2019-103327 A 6/2019
JP 2019115148 A * 7/2019

* cited by examiner

105

WIRELESS COMMUNICATION CHARGING CIRCUIT SYSTEM FOR WIRELESSLY RECEIVING POWER AND PERFORMING WIRELESS COMMUNICATION

CROSS-REFERENCE TO RELATED APPLICATIONS

This application claims benefit of priority to International Patent Application No. PCT/JP2021/040475, filed Nov. 3, 2021, and to Japanese Patent Application No. 2020-190074, filed Nov. 16, 2020, the entire contents of each are incorporated herein by reference.

BACKGROUND

Technical Field

The present disclosure relates to a wireless communication charging circuit system having a function of wirelessly receiving power, supplying the power to an internal circuit, and controlling charging of an internal power storage device, and a function of performing wireless communication.

Background Art

As an example of an IC card that includes a rechargeable battery, Japanese Unexamined Patent Application Publication No. 2012-238126 describes an IC card with fingerprint authentication. The IC card includes a fingerprint reading sensor. The IC card is configured to store power supplied from a reader in a power storage circuit, discharge the power to a device control circuit and a fingerprint processing circuit when an output voltage of the power storage circuit reaches a prescribed value, permit transmission to and reception from the reader when fingerprint authentication is successful, and thereafter prohibit transmission to and reception from the reader, and turn off discharge of power to the device control circuit and fingerprint processing circuit.

SUMMARY

A wireless charging electronic card has a near field communication function. A control circuit inside the card manages charging and discharging of a rechargeable battery and the supply of power to a communication circuit. The control circuit operates using received power and causes a charging circuit to operate when the rechargeable battery is to be charged. The control circuit stops the operation of the charging circuit and causes a communication circuit to operate when near field communication is to be performed. Thus, the control circuit is used to switch between operation of the charging circuit and operation of the communication circuit.

In the case of near field communication, if the control circuit operates using received power, the control circuit consumes the energy of the alternating magnetic field used for near field communication, and this results in decreased communication distance and communication quality in the near field communication. Although communication characteristics may be improved by adopting a configuration in which power is supplied to the control circuit from the rechargeable battery, the control circuit will always consume power from the rechargeable battery even when the communication characteristics are sufficiently assured, and this will result in increases in charging time and standby power, and the received power will not be fully utilized.

Accordingly, the present disclosure provides a wireless communication charging circuit system in which shortening of communication distance and degradation of communication quality are suppressed, and in which received power can be effectively utilized.

A wireless communication charging circuit system according to an example of the present disclosure includes a power reception coil that magnetically couples to a transmission antenna or a wireless power transmission coil of a reader-writer device; a power reception circuit that is electrically connected to the power reception coil and receives power induced in the power reception coil; a power storage device; and a charging circuit that is connected to the power storage device and charges the power storage device with power supplied from the power reception circuit. The wireless communication charging circuit system also includes a voltage conversion circuit that is connected to the power storage device and performs conversion to a prescribed voltage; a load that is electrically connected to the voltage conversion circuit and consumes power; a communication antenna; a communication circuit that is electrically connected to the communication antenna and performs communication using the communication antenna; and a control circuit that includes a microcontroller that controls operation and stopping of the voltage conversion circuit and operation and stopping of the charging circuit. During a period in which communication with the reader-writer device is to be performed using the communication antenna, the communication circuit causes the reader-writer device to recognize the communication circuit and communicates with the reader-writer device, and the control circuit sets a power path so that power used by the microcontroller is supplied from the power storage device. During a period in which charging of the power storage device is to be performed by the reader-writer device, the communication circuit causes the reader-writer device to recognize the communication circuit and operate so as to generate a magnetic field, and the control circuit sets a power path so that power used by the microcontroller is supplied from the power reception circuit.

With this configuration, power is supplied to the control circuit from the power storage device during a communication period, and power is supplied to the control circuit from the power reception circuit during a charging period.

According to the present disclosure, a wireless communication charging circuit system is obtained in which shortening of communication distance and degradation of communication quality during a communication period are suppressed and in which received power is effectively utilized in a charging period.

DETAILED DESCRIPTION

First Embodiment

Figure 1:
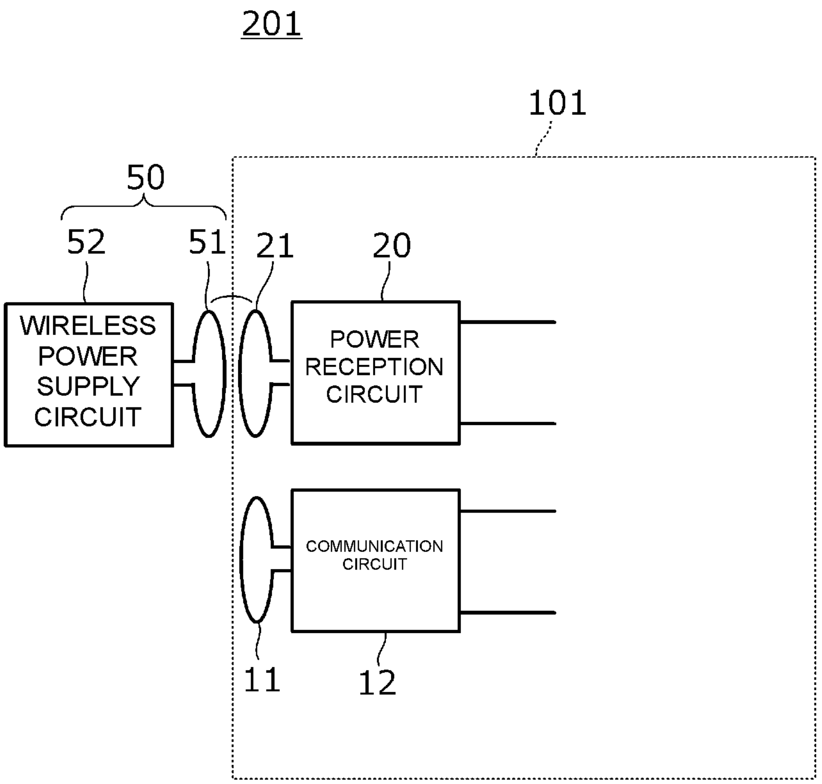
FIG. 1 is a block diagram illustrating the configuration of an electronic card and an electronic card system according to a First Embodiment.
Figure 2:
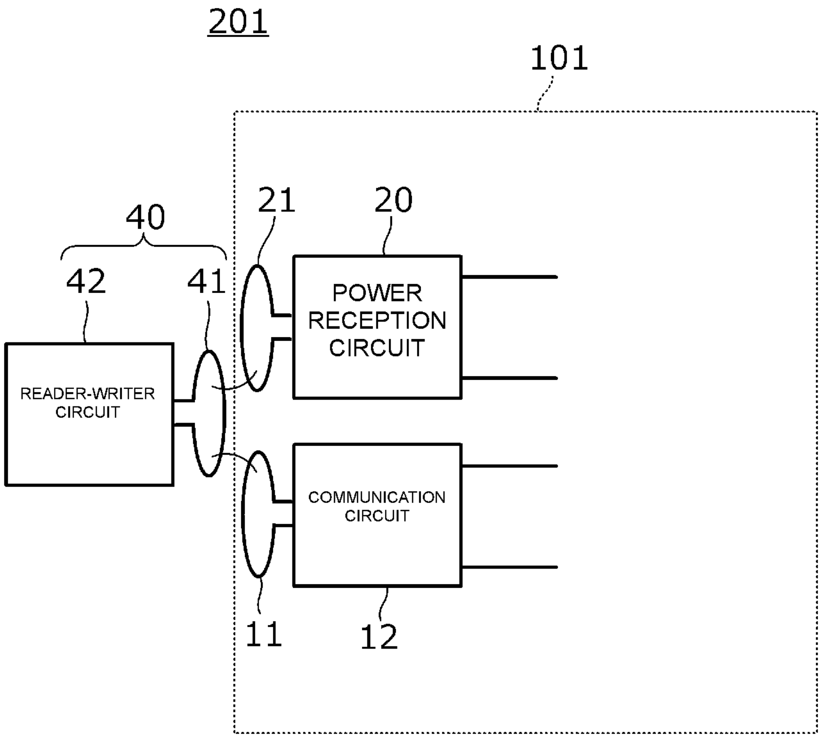
FIG. 2 is a block diagram illustrating another configuration of the electronic card and the electronic card system according to the First Embodiment.

FIGS. 1 and 2 are block diagrams illustrating the configurations of an electronic card 101 and an electronic card system 201 according to a First Embodiment. The electronic card system 201 is made up of the electronic card 101 and a reader-writer device 40. In addition, the electronic card system 201 is made up of the electronic card 101 and a wireless power supply device 50. The electronic card 101 is an example of a "wireless communication charging circuit system" of the present disclosure and all the circuits of the electronic card 101 are housed in an electronic card-shaped housing.

In FIG. 1, only part of the configuration inside the electronic card 101 is represented. The electronic card 101 includes a power reception coil 21, a power reception circuit 20 connected to the power reception coil 21, a communication antenna 11, and a communication circuit 12 connected to the communication antenna 11. The wireless power supply device 50 includes a wireless power supply coil 51 and a wireless power supply circuit 52.

The wireless power supply device 50 is, for example, a DC resonance technology wireless power supply device or a smartphone when a smartphone having NFC communication capability is used as a charging device.

The wireless power supply circuit 52 supplies alternating power to the wireless power supply coil 51 in ISM band (Industrial Scientific Medical Band) frequency bands such as 2.4 GHz, 5.7 GHz, and 920 MHz, or in the 6.78 MHz and 13.56 MHz frequency bands.

In the example illustrated in FIG. 1, the power reception coil 21 is magnetically coupled to the wireless power supply coil 51, and the electronic card 101 receives power wirelessly from the wireless power supply device 50.

In FIG. 2, the reader-writer device 40 includes a reader-writer antenna 41 and a reader-writer circuit 42.

In the example illustrated in FIG. 2, the reader-writer antenna 41 magnetically couples to the communication antenna 11, and the electronic card 101 wirelessly communicates with the reader-writer device 40. For example, near field communication (NFC) is performed with the communication circuit 12 at a frequency in the 13.56 MHz band.

The power reception coil 21 magnetically couples to the reader-writer antenna 41, and the electronic card 101 wirelessly receives power from the reader-writer device 40.

The electronic card 101 is an electronic device that is the size of a credit card, for example, having a thickness of 0.76 mm. This electronic card 101 is, for example, a card-sized smart phone (a mobile phone having an operating system for mobile phone use), a transportation IC card that displays the balance, a one-time password card, or a biometric authentication card.

Figure 3:
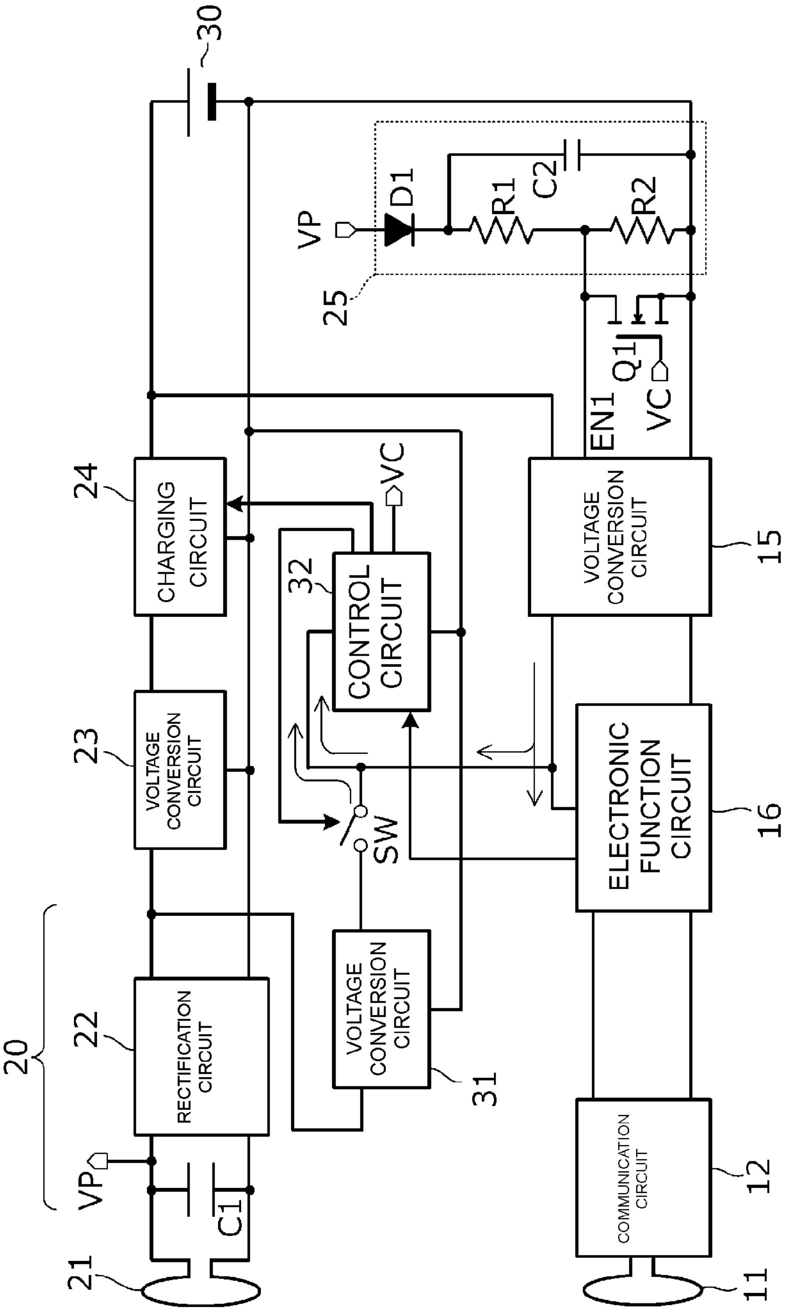
FIG. 3 is a block diagram illustrating the configuration of the electronic card according to the First Embodiment.

FIG. 3 is a block diagram illustrating the configuration of the electronic card 101. The electronic card 101 includes the power reception coil 21, the power reception circuit 20 connected to the power reception coil 21, the communication antenna 11, the communication circuit 12 connected to the communication antenna 11, a power storage device 30, a charging circuit 24 connected between the power reception circuit 20 and the power storage device 30, an electronic function circuit 16 (a load) connected to the communication circuit 12, a voltage conversion circuit 15 connected between the power storage device 30 and the electronic function circuit 16, a voltage conversion circuit 31 connected to an output section of a rectification circuit 22, and a control circuit 32 that controls the charging circuit 24 and the voltage conversion circuit 15. The control circuit 32 consists of a microcontroller or a circuit including a microcontroller. The electronic card 101 actively operates using the power storage device 30 as a power source.

The power reception circuit 20 includes a power reception resonance capacitor C1, which is connected to the power reception coil 21, and the rectification circuit 22. The power reception coil 21 and the power reception resonance capacitor C1 form a resonance circuit.

A voltage conversion circuit 23 converts an output voltage of the power reception circuit 20 (received voltage) into a voltage required to charge the power storage device 30.

The control circuit 32 controls operation of the charging circuit 24 and operation of the voltage conversion circuit 15. The voltage conversion circuit 31 converts the output voltage of the rectification circuit 22 and outputs the converted voltage as a power supply voltage to the control circuit 32.

A switch SW is provided between an output section of the voltage conversion circuit 31 and a power supply input section of the control circuit 32. An output section of the voltage conversion circuit 15 is connected to the electronic function circuit 16 (a load) and the power supply input of the control circuit 32. The switch SW is controlled using an output signal of the control circuit 32.

An enable signal EN1 for the voltage conversion circuit 15A is linked to a power reception detection circuit 25 consisting of a diode D1, a capacitor C2, and resistors R1 and R2. A switch element Q1 is provided in an output section of the power reception detection circuit 25. The switch element Q1 is formed of a MOS-FET. This switch element Q1 is controlled using an output signal of the control circuit 32. A voltage of a resonance circuit consisting of the power reception coil 21 and the power reception resonance capacitor C1 is applied to a voltage input section VP of the power reception detection circuit 25.

The diode D1 of the power reception detection circuit 25 rectifies the voltage of the resonance circuit consisting of the power reception coil 21 and the power reception resonance capacitor C1 and the capacitor C2 smooths the voltage. This rectified voltage is divided by the resistors R1 and R2. When the voltage at the voltage input section VP is greater than or equal to a prescribed value, the enable signal EN1 for the voltage conversion circuit 15 is at a high level. When the switch element Q1 is on, this enable signal EN1 is at a low level.

Operation of the electronic card 101 is as follows.

[When Electronic Card 101 is Brought Close to Reader-Writer Device 40]

(a) The power reception coil 21 receives power from the reader-writer antenna 41 of the reader-writer device 40. The voltage conversion circuit 23 converts the output voltage of the power reception circuit 20 and outputs the resulting voltage to the charging circuit 24.

(b) When the power reception coil 21 receives power from the reader-writer antenna 41 of the reader-writer device 40, the power reception detection circuit 25 sets the enable signal EN1 for the voltage conversion circuit 15 to the high level. As a result, the voltage conversion circuit 15 converts the voltage of the power storage device 30 and supplies the resulting power supply voltage to the electronic function circuit 16 and the control circuit 32.

(c) The electronic function circuit 16 operates using the output voltage of the voltage conversion circuit 15 as a power source.

(d) The communication antenna 11 is magnetically coupled to the reader-writer antenna 41, and the communication circuit 12 communicates with the reader-writer circuit 42. The electronic function circuit 16 inputs and outputs signals or data to and from the communication circuit 12.

Thus, in a period in which communication with the reader-writer device 40 is to be performed using the communication antenna 11, the communication circuit 12 causes the reader-writer device 40 to recognize the communication circuit 12 (recognize NFC-IC) and communicates with the reader-writer device 40, and the control circuit 32 sets a power path so that power used by the microcontroller in the control circuit 32 is supplied from the power storage device 30.

(e) The electronic function circuit 16 supplies a communication complete signal to the control circuit 32 once the communication is complete. Thus the control circuit 32 turns the switch element Q1 on by setting a control signal VC to a high level. As a result, the enable signal EN1 for the voltage conversion circuit 15 transitions to the low level, and therefore the voltage conversion circuit 15 stops operating.

However, the communication circuit 12 continues performing dummy communication with the reader-writer circuit 42 of the reader-writer device 40. (The communication circuit 12 is an IC that performs NFC communication and does not require the power supply voltage supplied from the voltage conversion circuit 15.) This dummy communication is communication for a recognition operation for recognizing the electronic card 101 performed by the reader-writer circuit 42. By performing this dummy communication, the power reception circuit 20 wirelessly receives power from the reader-writer device 40.

(f) After that, the control circuit 32 enables operation of the charging circuit 24. As a result, the charging circuit 24 starts charging the power storage device 30 with the output voltage of the voltage conversion circuit 23. This charging continues until the electronic card 101 is removed from the reader-writer device 40 and the dummy communication is completed.

Therefore, during the charging period, almost no power is consumed by the voltage conversion circuit 15, the electronic function circuit 16, or the control circuit 32.

Thus, in a period during which the power storage device 30 is to be charged by the reader-writer device 40, the communication circuit 12 causes the reader-writer device 40 to recognize the communication circuit 12 (recognize NFC-IC) and operate so as to cause a magnetic field to be generated from the reader-writer device 40, and the control circuit 32 sets a power path so that the power used by the microcontroller of the control circuit 32 is supplied from the power reception circuit 20.

[When Electronic Card 101 is Placed on Wireless Power Supply Device 50]

(a) The power reception coil 21 receives power from the wireless power supply coil 51 of the wireless power supply device 50. The voltage conversion circuit 23 converts the output voltage of the power reception circuit 20 and outputs the resulting voltage to the charging circuit 24.

(b) When the power reception coil 21 receives power from the wireless power supply coil 51 of the wireless power supply device 50, the power reception detection circuit 25 sets the enable signal EN1 for the voltage conversion circuit 15 to the high level. As a result, the voltage conversion circuit 15 converts the voltage of the power storage device 30 and supplies the resulting power supply voltage to the electronic function circuit 16 and the control circuit 32.

(c) The electronic function circuit 16 operates using the output voltage of the voltage conversion circuit 15 as a power source and causes the control circuit 32 to operate.

(d) The control circuit 32 puts the switch SW into a conductive state. Thus, the output voltage of the voltage conversion circuit 31 is supplied as a power supply voltage to the control circuit 32.

(e) The control circuit 32 sets the control signal VC to the high level. As a result, the switch element Q1 is turned on and the enable signal EN1 to the voltage conversion circuit 15 transitions to the low level, and therefore the voltage conversion circuit 15 stops operating.

(f) After that, the control circuit 32 enables operation of the charging circuit 24. As a result, the charging circuit 24 charges the power storage device 30 with the output voltage of the voltage conversion circuit 23.

Therefore, during the charging period, almost no power is consumed by the voltage conversion circuit 15, the electronic function circuit 16, or the control circuit 32.

With this configuration, power is supplied to the control circuit 32 from the power storage device 30 during a communication period, and power is supplied to the control circuit 32 from the power reception circuit 20 during a charging period. During a communication period in which information of the electronic function circuit 16 is to be communicated, the energy of the alternating magnetic field used for communication is coupled to the power reception coil 21, but the resulting power is not consumed by the control circuit 32. As a result, shortening of the communication distance and degradation of the communication quality are suppressed. On the other hand, during the charging period, almost no power is consumed by the voltage conversion circuit 15, the electronic function circuit 16, or the control circuit 32. As a result, the standby power is reduced, received power is effectively utilized, and the charging time of the power storage device 30 is shortened.

In the example illustrated above, the electronic function circuit 16 supplies a communication complete signal to the control circuit 32 once the communication is complete, but the electronic function circuit 16 may supply a communication complete signal to the control circuit 32 after a certain time from the start of communication (after the time required for communication has elapsed).

With this configuration, power is supplied to the control circuit 32 from the power storage device 30 during a communication period, and power is supplied to the control circuit 32 from the power reception circuit 20 during a charging period. During a communication period, even though the energy of the alternating magnetic field used for communication is coupled to the power reception coil 21, the resulting power is not consumed by the control circuit 32. As a result, shortening of the communication distance and degradation of the communication quality during a communication period are suppressed. On the other hand, during a charging period, the voltage conversion circuit 15, the electronic function circuit 16, and the control circuit 32 do not consume power from the storage device 30. As a result, the standby power is reduced, received power is effectively utilized, and the charging time of the power storage device 30 is shortened.

Second Embodiment

In a Second Embodiment, a wireless communication charging circuit system is illustrated in which the configuration for setting a power path is different from the example illustrated in the First Embodiment.

Figure 4:
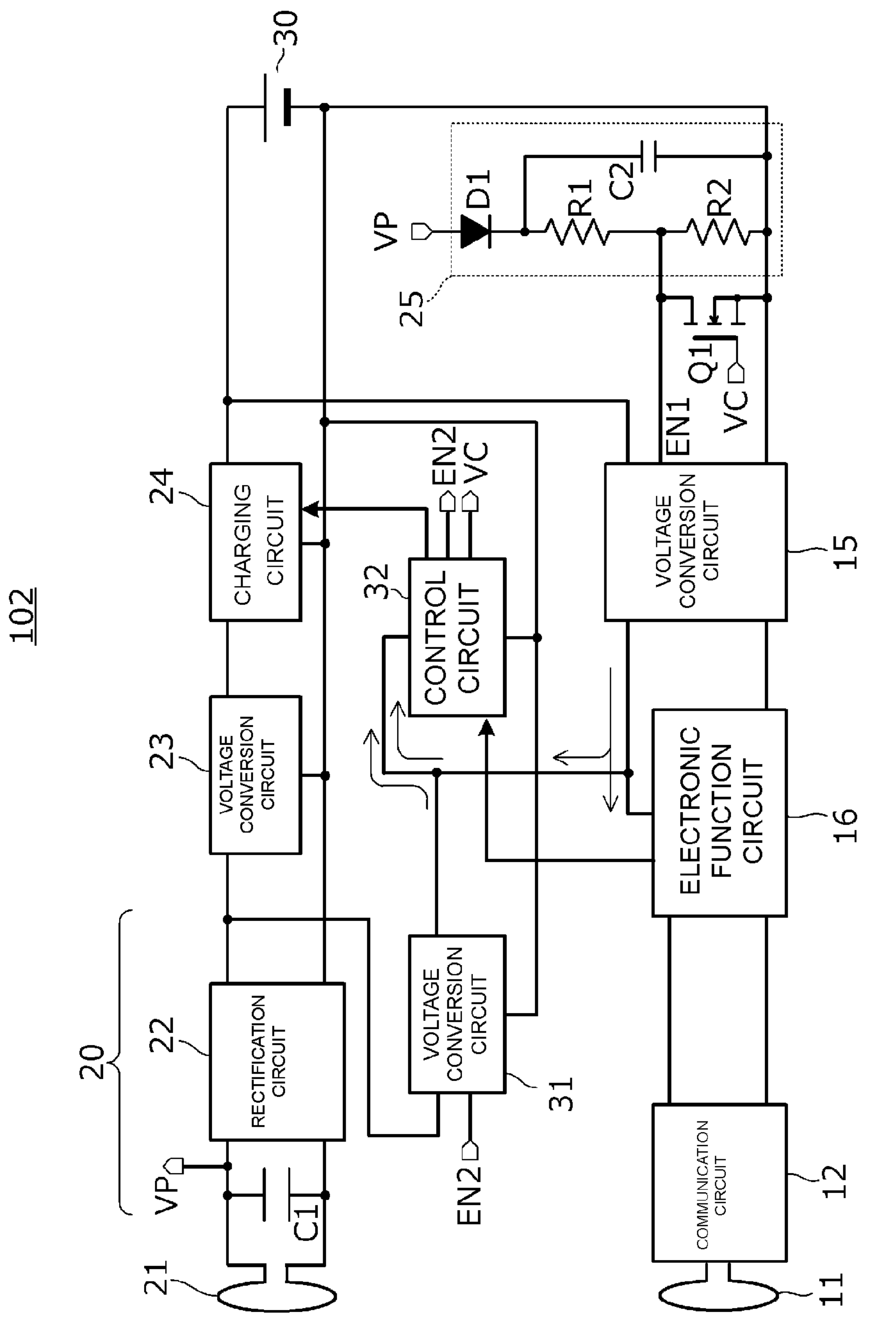
FIG. 4 is a block diagram illustrating the configuration of an electronic card according to a Second Embodiment.

FIG. 4 is a block diagram illustrating the configuration of an electronic card 102 according to the Second Embodiment. The configurations of the voltage conversion circuit 31 and the control circuit 32 are different from those in the electronic card 101 illustrated in FIG. 3. The voltage conversion circuit 31 includes an input terminal for an enable signal EN2. The control circuit 32 outputs the enable signal EN2 to the voltage conversion circuit 31. The control circuit 32 is supplied with a power supply voltage from the voltage conversion circuit 31 or the voltage conversion circuit 15.

Operation of the electronic card 102 is as follows.

[When Electronic Card 102 is Brought Close to Reader-Writer Device 40]

(a) The power reception coil 21 receives power from the reader-writer antenna 41 of the reader-writer device 40. The voltage conversion circuit 23 converts the output voltage of the power reception circuit 20 and outputs the resulting voltage to the charging circuit 24.

(b) When the power reception coil 21 receives power from the reader-writer antenna 41 of the reader-writer device 40, the power reception detection circuit 25 sets the enable signal EN1 for the voltage conversion circuit 15 to the high level. As a result, the voltage conversion circuit 15 converts the voltage of the power storage device 30 and supplies the resulting power supply voltage to the electronic function circuit 16 and the control circuit 32.

(c) The electronic function circuit 16 operates using the output voltage of the voltage conversion circuit 15 as a power source.

(d) The communication antenna 11 is magnetically coupled to the reader-writer antenna 41, and the communication circuit 12 communicates with the reader-writer circuit 42. The electronic function circuit 16 inputs and outputs signals or data to and from the communication circuit 12.

(e) The electronic function circuit 16 supplies a communication complete signal to the control circuit 32 once the communication is complete. Thus the control circuit 32 turns the switch element Q1 on by setting a control signal VC to a high level. As a result, the enable signal EN1 for the voltage conversion circuit 15 transitions to the low level, and therefore the voltage conversion circuit 15 stops operating.

However, the communication circuit 12 continues performing dummy communication with the reader-writer circuit 42 of the reader-writer device 40. This dummy communication is communication for a recognition operation for recognizing the electronic card 102 performed by the reader-writer circuit 42. By performing this dummy communication, the power reception circuit 20 wirelessly receives power from the reader-writer device 40. Therefore, the control circuit 32 operates using the output voltage of the voltage conversion circuit 31 as a power source.

(f) After that, the control circuit 32 enables operation of the charging circuit 24. The charging circuit 24 charges the power storage device 30 with the output voltage of the voltage conversion circuit 23.

Therefore, during the charging period, almost no power is consumed by the voltage conversion circuit 15, the electronic function circuit 16, or the control circuit 32.

[When Electronic Card 102 is Placed on Wireless Power Supply Device 50](a) The power reception coil 21 receives power from the wireless power supply coil 51 of the wireless power supply device 50. The voltage conversion circuit 23 converts the output voltage of the power reception circuit 20 and outputs the resulting voltage to the charging circuit 24.

(b) When the power reception coil 21 receives power from the wireless power supply coil 51 of the wireless power supply device 50, the power reception detection circuit 25 sets the enable signal EN1 for the voltage conversion circuit 15 to the high level. As a result, the voltage conversion circuit 15 converts the voltage of the power storage device 30 and supplies the resulting power supply voltage to the electronic function circuit 16 and the control circuit 32.

(c) The electronic function circuit 16 operates using the output voltage of the voltage conversion circuit 15 as a power source and causes the control circuit 32 to operate.

(d) The control circuit 32 sets the enable signal EN2 for voltage conversion circuit 31 to the high level (enabled). Thus, the output voltage of the voltage conversion circuit 31 is supplied as a power supply voltage to the control circuit 32.

(e) The control circuit 32 sets the control signal VC to the high level. As a result, the switch element Q1 is turned on and the enable signal EN1 to the voltage conversion circuit 15 transitions to the low level, and therefore the voltage conversion circuit 15 stops operating.

(f) After that, the control circuit 32 enables operation of the charging circuit 24. As a result, the charging circuit 24 charges the power storage device 30 with the output voltage of the voltage conversion circuit 23.

Therefore, during the charging period, almost no power is consumed by the voltage conversion circuit 15, the electronic function circuit 16, or the control circuit 32.

With the above configuration, effects substantially the same as those in the example illustrated in the First Embodiment are obtained.

Third Embodiment

In a Third Embodiment, a wireless communication charging circuit system is illustrated in which the configuration for setting a power path is different from the example illustrated in the First Embodiment.

Figure 5:
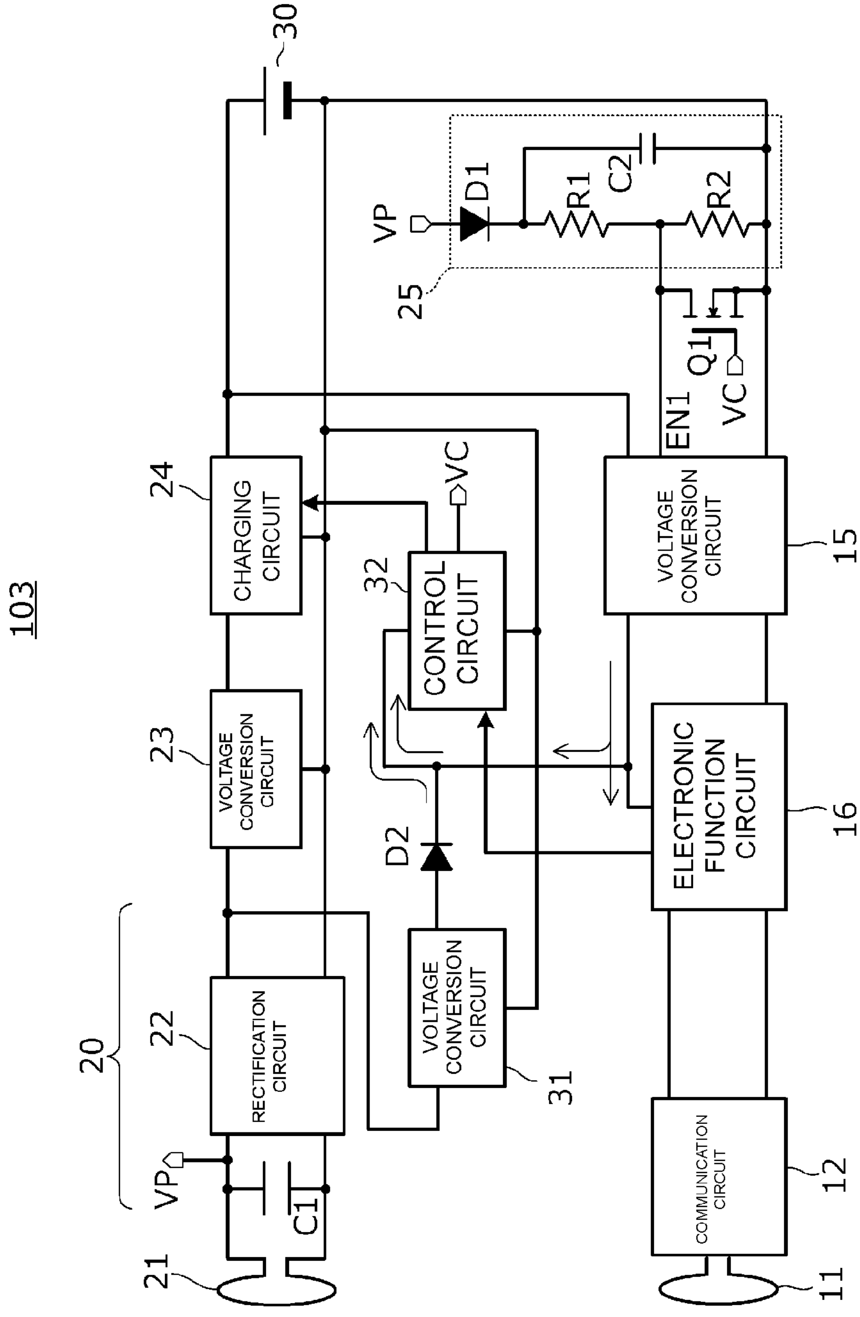
FIG. 5 is a block diagram illustrating the configuration of an electronic card according to a Third Embodiment.

FIG. 5 is a block diagram illustrating the configuration of an electronic card 103 according to the Third Embodiment.

The configuration of the switch SW differs from that of the electronic card 101 illustrated in FIG. 1. In the example illustrated in FIG. 5, the switch part is formed using a diode D2. The rest of the configuration is the same as that illustrated in the First Embodiment.

The overall operation of the electronic card 103 is as follows.

[When Electronic Card 103 is Brought Close to Reader-Writer Device 40]

Operation of the electronic card 103 is substantially the same as that of the electronic card 101 illustrated in the First Embodiment or the electronic card 102 illustrated in the Second Embodiment.

[When Electronic Card 103 is Placed on Wireless Power Supply Device 50]

(a) The power reception coil 21 receives power from the wireless power supply coil 51 of the wireless power supply device 50. The voltage conversion circuit 23 converts the output voltage of the power reception circuit 20 and outputs the resulting voltage to the charging circuit 24.

(b) When the power reception coil 21 receives power from the wireless power supply coil 51 of the wireless power supply device 50, the power reception detection circuit 25 sets the enable signal EN1 for the voltage conversion circuit 15 to the high level. As a result, the voltage conversion circuit 15 converts the voltage of the power storage device 30 and supplies the resulting power supply voltage to the electronic function circuit 16 and the control circuit 32.

(c) The output voltage of the voltage conversion circuit 31 is lower than the output voltage of the voltage conversion circuit 15. For example, the output voltage of the voltage conversion circuit 31 is 3.0 V and the output voltage of the voltage conversion circuit 15 is 3.3 V. Therefore, the electronic function circuit 16 operates using the output voltage of the voltage conversion circuit 15 as a power source. The control circuit 32 operates using the output voltage of the voltage conversion circuit 15.

(d) The control circuit 32 sets the control signal VC to the high level. As a result, the switch element Q1 is turned on and the enable signal EN1 to the voltage conversion circuit 15 transitions to the low level, and therefore the voltage conversion circuit 15 stops operating.

(e) After that, the control circuit 32 enables operation of the charging circuit 24. As a result, the charging circuit 24 charges the power storage device 30 with the output voltage of the voltage conversion circuit 23.

Therefore, during the charging period, almost no power is consumed by the voltage conversion circuit 15, the electronic function circuit 16, and the control circuit 32, and the control circuit 32 operates using the output voltage of the voltage conversion circuit 31.

With the above configuration, effects substantially the same as in the example illustrated in the first and Second Embodiments are obtained.

Fourth Embodiment

In a Fourth Embodiment, a wireless communication charging circuit system is illustrated in which the configuration for setting a power path is different from the examples illustrated in the previous embodiments.

Figure 6:
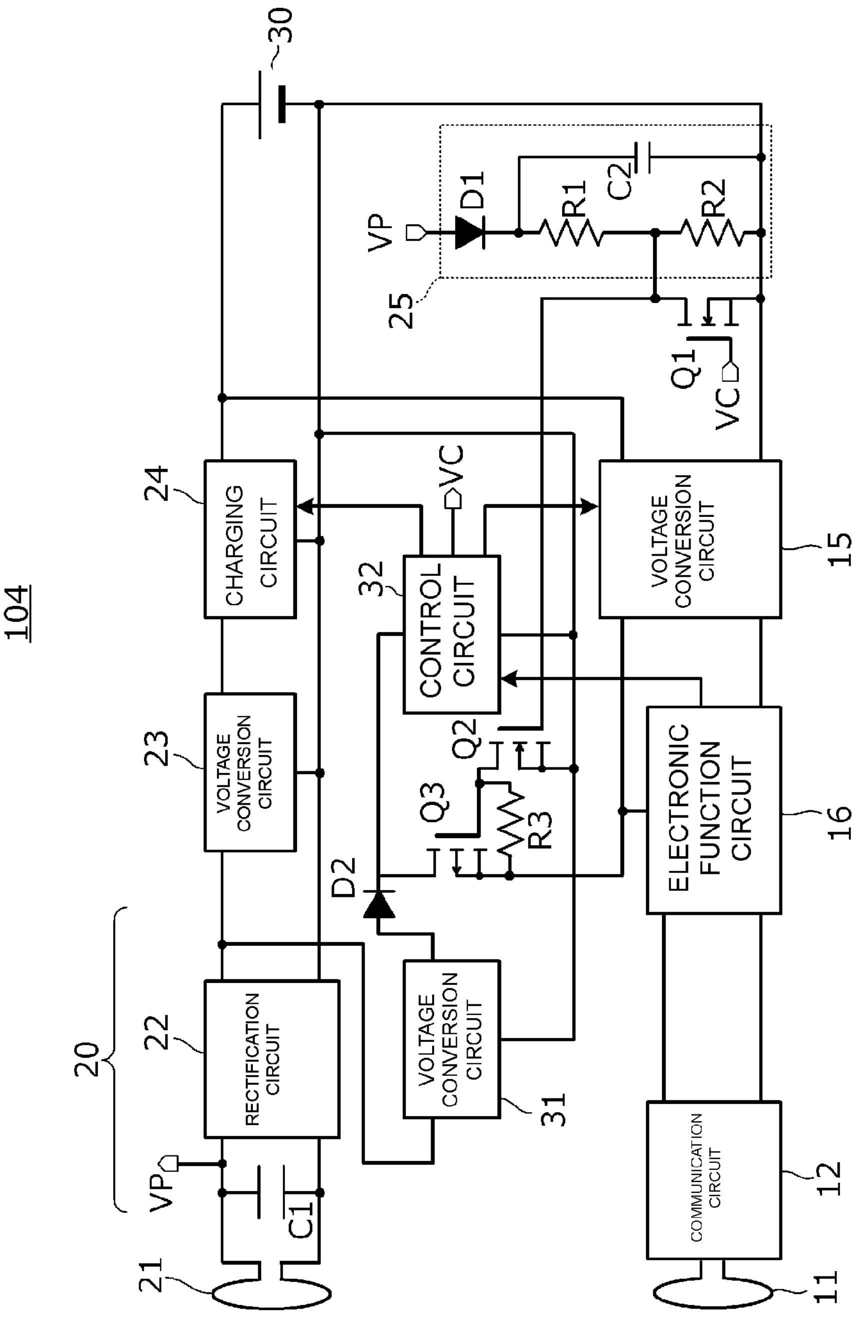
FIG. 6 is a block diagram illustrating the configuration of an electronic card according to a Fourth Embodiment.

FIG. 6 is a block diagram illustrating the configuration of an electronic card 104 according to the Fourth Embodiment. In contrast to the electronic card 103 illustrated in FIG. 5, in this electronic card 104, a switch circuit consisting of switch elements Q2 and Q3 and a resistor R3 is provided between an output section of the voltage conversion circuit 15 and a power supply voltage input section of the control circuit 32. The output of the power reception detection circuit 25 is connected to the gate of the switch element Q2.

The overall operation of the electronic card 104 is as follows.

[When Electronic Card 104 is Brought Close to Reader-Writer Device 40]

(a) The power reception coil 21 receives power from the reader-writer antenna 41 of the reader-writer device 40. The voltage conversion circuit 23 converts the output voltage of the power reception circuit 20 and outputs the resulting voltage to the charging circuit 24.

(b) When the power reception coil 21 receives power from the reader-writer antenna 41 of the reader-writer device 40, the power reception detection circuit 25 sets the voltage supplied to the gate of the switch element Q2 to the high level. As a result, the switch element Q3 enters a conductive state, and the output voltage of the voltage conversion circuit 15 is supplied to the electronic function circuit 16 and the control circuit 32 as a power supply voltage.

(c) The output voltage of the voltage conversion circuit 31 is lower than the output voltage of the voltage conversion circuit 15. For example, the output voltage of the voltage conversion circuit 31 is 3.0 V and the output voltage of the voltage conversion circuit 15 is 3.3 V. Therefore, the electronic function circuit 16 operates using the output voltage of the voltage conversion circuit 15 as a power source and inputs and outputs signals to and from the communication circuit 12. The control circuit 32 operates using the output voltage of the voltage conversion circuit 15.

(d) The communication antenna 11 is magnetically coupled to the reader-writer antenna 41, and the communication circuit 12 communicates with the reader-writer circuit 42.

(e) The electronic function circuit 16 supplies a communication complete signal to the control circuit 32 once the communication is complete. As a result, the control circuit 32 stops operation of the voltage conversion circuit 15. In addition, the control circuit 32 turns the switch element Q1 on by setting the control signal VC to the high level. As a result, the switch elements Q2 and Q3 are turned off and the supply of power from the voltage conversion circuit 15 to the control circuit 32 is stopped.

However, the communication circuit 12 continues performing dummy communication with the reader-writer circuit 42 of the reader-writer device 40. This dummy communication is communication for a recognition operation for recognizing the electronic card 101 performed by the reader-writer circuit 42. By performing this dummy communication, the power reception circuit 20 wirelessly receives power from the reader-writer device 40. Therefore, the control circuit 32 operates using the output voltage of the voltage conversion circuit 31 as a power source.

(f) After that, the control circuit 32 enables operation of the charging circuit 24. As a result, the charging circuit 24 charges the power storage device 30 with the output voltage of the voltage conversion circuit 23.

Therefore, during the charging period, almost no power is consumed by the control circuit 32 or the voltage conversion circuit 15.

[When Electronic Card 104 is Placed on Wireless Power Supply Device 50]

(a) The power reception coil 21 receives power from the wireless power supply coil 51 of the wireless power supply device 50. The voltage conversion circuit 23 converts the output voltage of the power reception circuit 20 and outputs the resulting voltage to the charging circuit 24.

(b) When the power reception coil 21 receives power from the wireless power supply coil 51 of the wireless power supply device 50, the power reception detection circuit 25 sets the voltage supplied to the gate of the switch element Q2 to the high level. As a result, the switch element Q3 enters a conductive state, and the output voltage of the voltage conversion circuit 15 is supplied to the electronic function circuit 16 and the control circuit 32 as a power supply voltage.

(c) The electronic function circuit 16 operates using the output voltage of the voltage conversion circuit 15 as a power source and causes the control circuit 32 to operate.

(d) The output voltage of the voltage conversion circuit 31 is lower than the output voltage of the voltage conversion circuit 15. For example, the output voltage of the voltage conversion circuit 31 is 3.0 V and the output voltage of the voltage conversion circuit 15 is 3.3 V. Therefore, the electronic function circuit 16 operates using the output voltage of the voltage conversion circuit 15 as a power source and inputs and outputs signals to and from the communication circuit 12. The control circuit 32 operates using the output voltage of the voltage conversion circuit 15.

(e) The control circuit 32 sets the control signal VC to the high level. As a result, the switch element Q1 is turned on and the switch elements Q2 and Q3 are turned off, and therefore the supply of power from the voltage conversion circuit 15 to the control circuit 32 is stopped.

(f) After that, the control circuit 32 enables operation of the charging circuit 24. As a result, the charging circuit 24 charges the power storage device 30 with the output voltage of the voltage conversion circuit 23.

With the above configuration, effects substantially the same as those in the example illustrated in the First Embodiment are obtained.

Fifth Embodiment

In a Fifth Embodiment, a wireless communication charging circuit system is illustrated in which the configuration for setting a power path is different from the examples illustrated in the previous embodiments.

Figure 7:
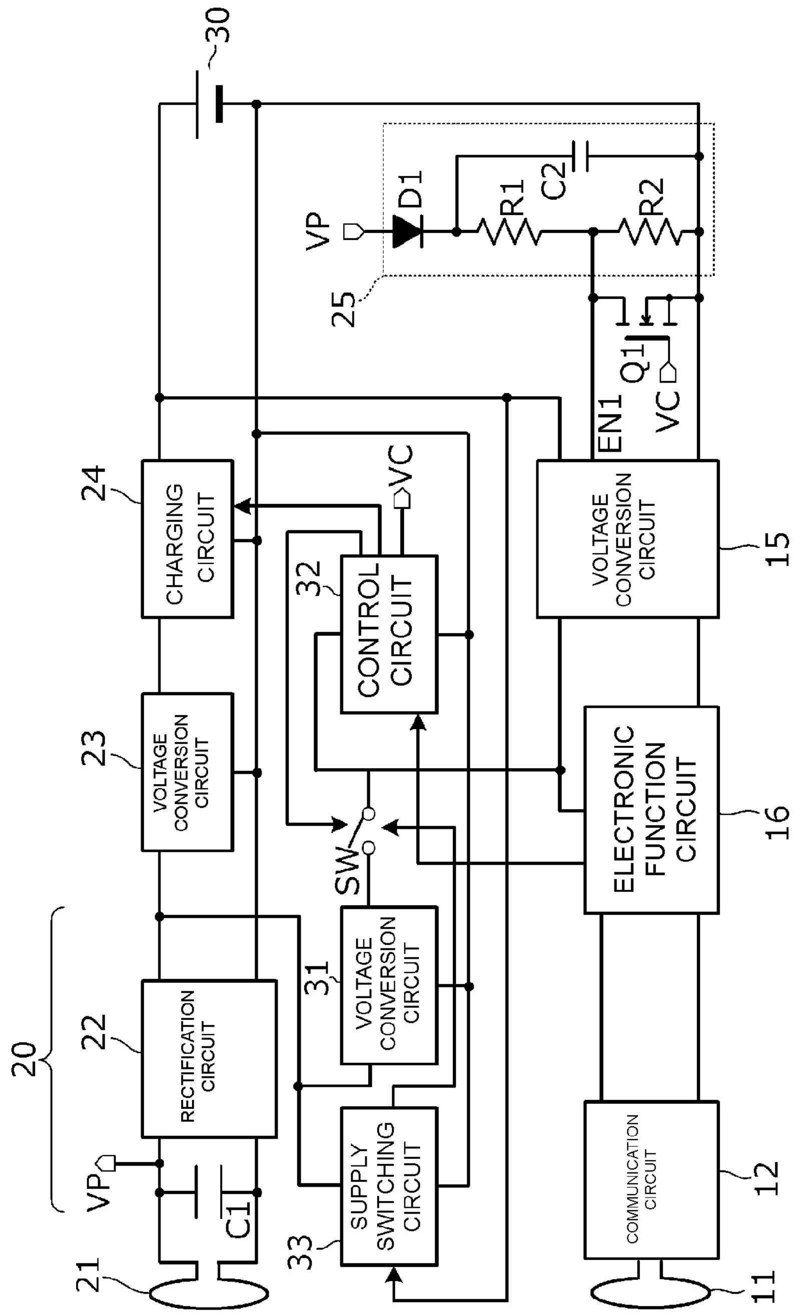
FIG. 7 is a block diagram illustrating the configuration of an electronic card according to a Fifth Embodiment.

FIG. 7 is a block diagram illustrating the configuration of an electronic card 105 according to the Fifth Embodiment. The fifth embodiment includes a supply switching circuit 33 that controls the switch SW. The switch SW is controlled not only by the control circuit 32 but also by the supply switching circuit 33. The rest of the configuration is the same as that illustrated in the First Embodiment.

The supply switching circuit 33 controls the switch SW in accordance with the output voltage of the charging circuit 24 and the voltage of the power storage device 30. The supply switching circuit 33 also detects the remaining power of the power storage device 30. During a communication period in which communication is performed by the communication circuit 12, if the remaining power of the power storage device 30 is greater than or equal to a prescribed amount, the supply switching circuit 33 disconnects the switch SW1. As a result, a power supply voltage is supplied to the control circuit 32 from the voltage conversion circuit 15 (from the power storage device 30). If the remaining power of the power storage device 30 is less than the prescribed amount, the supply switching circuit 33 puts the switch SW into a conductive state. As a result, a power supply voltage is supplied to the control circuit 32 from the power reception circuit 20 (from the voltage conversion circuit 31).

In this embodiment, the supply switching circuit 33 corresponds to a power storage device remaining power detecting means for detecting the remaining power of the power storage device 30.

According to this embodiment, the function of the control circuit 32 can be maintained even when the remaining power of the power storage device 30 is insufficient. When there is sufficient remaining power in the power storage device 30, even when the energy of the alternating magnetic field used for communication is coupled to the power reception coil 21, the resulting power is not consumed by the control circuit 32, and therefore shortening of the communication distance and degradation of the communication quality are suppressed.

Sixth Embodiment

In a Sixth Embodiment, a wireless communication charging circuit system is illustrated in which the configuration of a supply switching unit for the control circuit 32 is different from in the previous embodiments.

Figure 8:
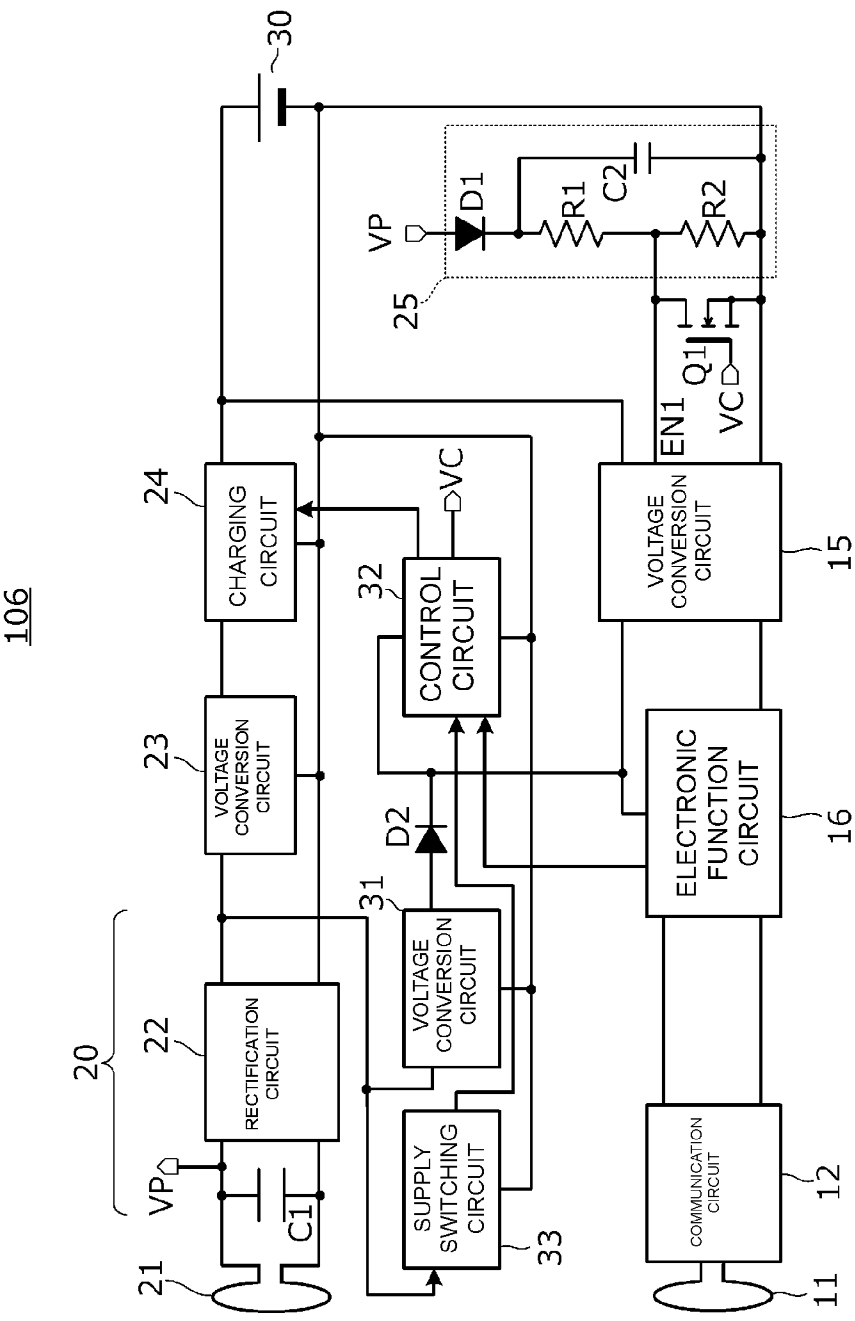
FIG. 8 is a block diagram illustrating the configuration of an electronic card according to a Sixth Embodiment.

FIG. 8 is a block diagram illustrating the configuration of an electronic card 106 according to the Sixth Embodiment.

The Sixth Embodiment includes a supply switching circuit 33 and a diode D2. The rest of the configuration is the same as that illustrated in the Third Embodiment.

In the example illustrated in FIG. 8, the supply switching circuit 33 detects a voltage received by the power reception circuit 20. The supply switching circuit 33 supplies power to the control circuit 32 from the power reception circuit 20 when the voltage received by the power reception circuit 20 exceeds a prescribed value, and supplies power to the control circuit 32 from the power storage device 30 when the voltage received by the power reception circuit 20 does not exceed the prescribed value.

During a communication period in which communication is performed by the communication circuit 12, the enable signal EN1 of the voltage conversion circuit 15 is enabled based on the output signal of the power reception detection circuit 25, and the voltage conversion circuit 15 operates. Since the output voltage of the voltage conversion circuit 15 is higher than the output voltage of the voltage conversion circuit 31, the control circuit 32 operates using the power of the power storage device 30. At this time, if the supply switching circuit 33 detects that the voltage received by the power reception circuit 20 is greater than or equal to a threshold, the supply switching circuit 33 supplies a control signal to the control circuit 32. As a result, the control circuit 32 sets the control signal VC to the high level. As a result, the voltage conversion circuit 15 stops operating, and the control circuit 32 operates using power received from the power reception circuit 20.

During a charging period, the control circuit 32 enables operation of the charging circuit 24. The charging circuit 24 charges the power storage device 30 with the output voltage of the voltage conversion circuit 23.

According to this embodiment, when the energy of the alternating magnetic field is sufficient, received energy is used as power for the control circuit 32, and therefore the power consumption of the battery can be reduced and the energy of the alternating magnetic field can be effectively utilized. Conversely, when the energy of the alternating magnetic field is not sufficient, the energy of the power storage device 30 is used as power for the control circuit 32, and therefore shortening of the communication distance and degradation of communication quality are suppressed.

Finally, the present disclosure is not limited to the above-described embodiments. Appropriate modifications and changes can be made by one skilled in the art. The scope of the present disclosure is defined by the following claims rather than by the above-described embodiments. In addition, modifications and changes from the embodiments that are within the scope of equivalents to the scope of the claims are included in the scope of the present disclosure.

What is claimed is:

1. A wireless communication charging circuit system comprising:

a power reception coil configured to magnetically couple to a transmission antenna or a wireless power transmission coil of a reader-writer device;

a power reception circuit that is electrically connected to the power reception coil and is configured to receive power induced in the power reception coil;

a power storage device;

a charging circuit that is connected to the power storage device and is configured to charge the power storage device with power supplied from the power reception circuit;

a voltage conversion circuit that is connected to the power storage device and is configured to perform conversion to a prescribed voltage;

a load that is electrically connected to the voltage conversion circuit and is configured to consume power;

a communication antenna;

a communication circuit that is electrically connected to the communication antenna and is configured to perform communication using the communication antenna; and a control circuit that includes a microcontroller that is configured to control operation and stopping of the voltage conversion circuit and operation and stopping of the charging circuit, wherein during a period in which communication with the reader-writer device is to be performed using the communication antenna, the communication circuit is configured to cause the reader-writer device to recognize the communication circuit and communicate with the reader-writer device, and the control circuit is configured to set a power path so that power used by the microcontroller is supplied from the power storage device, and during a period in which charging of the power storage device is to be performed by the reader-writer device, the communication circuit is configured to cause the reader-writer device to recognize the communication circuit and operate so as to generate a magnetic field, and the control circuit is configured to set a power path so that power used by the microcontroller is supplied from the power reception circuit.

2. The wireless communication charging circuit system according to claim 1, wherein after a communication period ends or after a certain time has elapsed since the communication began, the control circuit is configured to perform switching so that power used by the microcontroller is supplied from the power reception circuit.

3. The wireless communication charging circuit system according to claim 1, further comprising:

a communication detection unit configured to detect a communication state of the communication circuit, wherein the control circuit is configured to stop supplying power used by the microcontroller from the power storage device when the communication state is a state in which communication is not performed.

4. The wireless communication charging circuit system according to claim 1, further comprising:

a power storage device remaining power detecting unit configured to detect remaining power of the power storage device, wherein during a communication period in which communication is to be performed by the communication circuit, the control circuit is configured to set a power path so that power used by the microcontroller is supplied from the power storage device when remaining power of the power storage device is greater than or equal to a prescribed amount, and the control circuit is configured to set a power path so that the power used by the control circuit is supplied from the power reception circuit when remaining power of the power storage device is less than the prescribed amount.

5. The wireless communication charging circuit system according to claim 1, wherein the load includes an electronic function circuit, and the communication circuit is configured to perform communication based on information of the electronic function circuit.

6. The wireless communication charging circuit system according to claim 5, wherein during a communication period in which the communication circuit communicates the information of the electronic function circuit, the control circuit is configured to set a power path so that power used by the microcontroller is supplied from the power reception circuit when a voltage received by the power reception circuit exceeds a prescribed value, and the control circuit is configured to set a power path so that power used by the microcontroller is supplied from the power storage device when a voltage received by the power reception circuit does not exceed the prescribed value.

7. The wireless communication charging circuit system according to claim 1, wherein the power reception coil, the power reception circuit, the power storage device, the charging circuit, the voltage conversion circuit, the load, the communication antenna, the communication circuit, and the control circuit are housed in a card-shaped housing.

8. The wireless communication charging circuit system according to claim 2, further comprising:

a power storage device remaining power detecting unit configured to detect remaining power of the power storage device, wherein during the communication period in which communication is to be performed by the communication circuit, the control circuit is configured to set a power path so that power used by the microcontroller is supplied from the power storage device when remaining power of the power storage device is greater than or equal to a prescribed amount, and the control circuit is configured to set a power path so that the power used by the control circuit is supplied from the power reception circuit when remaining power of the power storage device is less than the prescribed amount.

9. The wireless communication charging circuit system according to claim 3, further comprising:

a power storage device remaining power detecting unit configured to detect remaining power of the power storage device, wherein during a communication period in which communication is to be performed by the communication circuit, the control circuit is configured to set a power path so that power used by the microcontroller is supplied from the power storage device when remaining power of the power storage device is greater than or equal to a prescribed amount, and the control circuit is configured to set a power path so that the power used by the control circuit is supplied from the power reception circuit when remaining power of the power storage device is less than the prescribed amount.

10. The wireless communication charging circuit system according to claim 2, wherein the load includes an electronic function circuit, and the communication circuit is configured to perform communication based on information of the electronic function circuit.

11. The wireless communication charging circuit system according to claim 3, wherein the load includes an electronic function circuit, and the communication circuit is configured to perform communication based on information of the electronic function circuit.

12. The wireless communication charging circuit system according to claim 4, wherein the load includes an electronic function circuit, and the communication circuit is configured to perform communication based on information of the electronic function circuit.

13. The wireless communication charging circuit system according to claim 8, wherein the load includes an electronic function circuit, and the communication circuit is configured to perform communication based on information of the electronic function circuit.

14. The wireless communication charging circuit system according to claim 9, wherein the load includes an electronic function circuit, and the communication circuit is configured to perform communication based on information of the electronic function circuit.

15. The wireless communication charging circuit system according to claim 2, wherein the power reception coil, the power reception circuit, the power storage device, the charging circuit, the voltage conversion circuit, the load, the communication antenna, the communication circuit, and the control circuit are housed in a card-shaped housing.

16. The wireless communication charging circuit system according to claim 3, wherein the power reception coil, the power reception circuit, the power storage device, the charging circuit, the voltage conversion circuit, the load, the communication antenna, the communication circuit, and the control circuit are housed in a card-shaped housing.

17. The wireless communication charging circuit system according to claim 4, wherein the power reception coil, the power reception circuit, the power storage device, the charging circuit, the voltage conversion circuit, the load, the communication antenna, the communication circuit, and the control circuit are housed in a card-shaped housing.

18. The wireless communication charging circuit system according to claim 5, wherein the power reception coil, the power reception circuit, the power storage device, the charging circuit, the voltage conversion circuit, the load, the communication antenna, the communication circuit, and the control circuit are housed in a card-shaped housing.

19. The wireless communication charging circuit system according to claim 6, wherein the power reception coil, the power reception circuit, the power storage device, the charging circuit, the voltage conversion circuit, the load, the communication antenna, the communication circuit, and the control circuit are housed in a card-shaped housing.

20. The wireless communication charging circuit system according to claim 8, wherein the power reception coil, the power reception circuit, the power storage device, the charging circuit, the voltage conversion circuit, the load, the communication antenna, the communication circuit, and the control circuit are housed in a card-shaped housing.

* * * * *